: 2,809,926
Patented Oct. 15, 1957

2,809,926

PURIFICATION OF PHTHALIC ANHYDRIDE

Marvin O. Shrader and Harold L. Dimond, Pittsburgh, Pa., assignors to Pittsburgh Coke & Chemical Company, Pittsburgh, Pa., a corporation of Pennsylvania No Drawing. Application September 7, 1955, Serial No. 533,015

8 Claims. (Cl. 202—57)

The present invention relates to the purification of phthalic anhydride to improve its color and color stability and, more particularly, to the purification of crude phthalic anhydride containing alpha-naphthoquinone and related bodies which are colored or form colored compounds.

Phthalic anhydride has many uses which require it to be substantially free of color and bodies which develop color upon heating. Among such uses are the manufacture of light-colored resins, e. g., glyceryl phthalate and diallyl phthalate type resins; plasticizers, e. g., butyl decyl phthalate and dioctyl phthalate, etc.

Phthalic anhydride is conventionally prepared today by the catalytic oxidation of naphthalene vapors. Crude phthalic anhydride thus obtained usually contains relatively small amounts of impurities, such as naphthoquinones, especially, alpha-naphthaquinone, and other color-forming impurities. Conventionally, phthalic anhydride is purified by heating it at reflux for a considerable period of time to polymerize or otherwise decompose the impurities which would, otherwise, codistill with the phthalic anhydride and give a colored product, or one which becomes colored upon heating. This conventional heat treatment, however, does not remove all of the undesired naphthoquinone and other color-forming bodies.

An object of the present invention is to provide a simple, efficient, and economical method for purifying crude phthalic anhydride.

Another object of the invention is to provide a simple chemical purification treatment of crude phthalic anhydride which has been prepared by the vapor phase catalytic oxidation of naphthalene, whereby a purified phthalic anhydride of low color and of excellent heat color stability is obtained.

A further object of the invention is to provide an improved process for purifying crude phthalic anhydride which contains impurities of the type of alpha-naphthoquinone.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To be successful in aiding in the purification of phthalic anhydride, a chemical reagent must tie up the color bodies (whose chemical nature is not completely understood); it must remove or destroy substantially all of the alpha-naphthoquinone present; it must dissolve in molten phthalic anhydride or remain suspended, so as not to plug the system; it must be non-volatile at temperatures up to and beyond the boiling point of phthalic anhydride; preferably, it should be capable of reducing the 18 hours of heat-treating time normally required in the commercial purification of phthalic anhydride; it must be inexpensive, readily available, preferably non-toxic in the amounts employed, non-corrosive and effective in small concentrations.

It has now been found that the above mentioned objects can be accomplished by heating the crude phthalic anhydride with a minor amount of lead carbonate to react with the color-forming impurities present to change them to a removable form, and, thereafter, recovering the purified phthalic anhydride in conventional manner, e. g., by distillation and the like.

In the present specification and claims, all proportions and percentages are by weight, unless otherwise indicated.

All references to numerical "color" values, e. g., "initial color" and "heat color," are according to the Platinum-Cobalt (Hazen) Color Standard, described at page 71 of the 1939 edition of "Physical and Chemical Examination of Paints, Varnishes, Lacquers and Colors" by Henry A. Gardner, published by the Institute of Paint and Varnish Research, Washington, D. C. It is especially desirable that the phthalic anhydride, after purification, have a "heat color" of 30 or under.

By "initial color" is meant the color of the molten phthalic anhydride immediately after distillation from the mixture containing the color-forming bodies. By "heat color" is meant the color of the molten phthalic anhydride which has been distilled from the mixture containing the color-forming bodies and then has been subjected to a temperature of 250° C. for 1.5 hours. The "heat color" test is also indicative of heat stability. The lower the color number, in general, the better is the heat stability of the phthalic anhydride.

The crude phthalic anhydride, either with or without a preliminary distillation, is mixed with the lead carbonate, and the mixture is heated at any temperature above the melting point of the phthalic anhydride to the reflux temperature. At atmospheric pressure, this is a range of from about 127° C. to 284° C. The treatment can be carried out at subatmospheric or superatmospheric pressure but, preferably, atmospheric pressure is employed. The heat treatment is continued until substantial improvement in the heat color test is obtained. Usually, a time of 4 to 22 hours, preferably 6 to 18 hours, is used. A time of 12 to 16 hours has proven especially satisfactory.

Based on the phthalic anhydride, the lead carbonate can be present in an amount as low as 0.05%, or even lower, to 20% or even higher. Generally, no advantage is obtained from the use of such excessively large amounts of lead carbonate to compensate for the increased cost and it has been found preferable to use 0.1 to 1% of the lead carbonate.

In the following examples, the samples were heat-treated in a one-liter, three-neck, ground-glass flask, placed in an air bath. The samples were maintained at 285° C. (reflux temperature) for the times indicated and the air bath was maintained at a temperature between about 285° and 300° C. The final product was obtained by distillation through a 23-inch column, packed with 0.16 x 0.16 stainless steel, protruded packing, unless otherwise noted.

In the examples, a forecut of about 20% was taken during each run followed by three heart cuts of approximately 20% each and initial and heat colors were taken on each of these four cuts in the manner previously set forth. No initial or heat color was taken on the residue in the flask (about 20% of the crude phthalic anhydride). The phthalic anhydride employed in the examples was prepared by the catalytic oxidation of naphthalene and was in the crude form, except in those examples where it is indicated that the crude phthalic anhydride was first partially purified by a simple distillation prior to the heat treatment with the chemical reagent.

based on the weight of the phthalic anhydride and thereafter recovering the pure phthalic anhydride.

| Example | Reagent and Amount based on the phthalic anhydride | Forecut Initial Color | Heat Cuts ||||||  Time of Refluxing, Hours | Weight of Phthalic anhydride, grams | Comments |
|---|---|---|---|---|---|---|---|---|---|---|---|
| | | | Cut No. 1 || Cut No. 2 || Cut No. 3 || | | |
| | | | Initial Color | Heat Color | Initial Color | Heat Color | Initial Color | Heat Color | | | |
| 1 | No reagent | 25 | 20 | 140 | 20 | 110 | 20 | 110 | 6 | 327.4 | partially purified by simple distillation. |
| 2 | ---do--- | 20 | 20 | 55 | 15 | 70 | 15 | 50 | 9 | 409.7 | positive naphthoquinone |
| 3 | ---do--- | 60 | 20 | 65 | 20 | 200 | 15 | 95 | 12 | 483.7 | Do. |
| 4 | ---do--- | 110 | 40 | 225 | 20 | 95 | 15 | 45 | 18 | 350 | Do. |
| 5 | 1% PbCO$_3$ | 5 | 15 | 15 | 15 | 10 | 15 | 5 | 6 | 407.8 | negative naphthoquinone, partially purified by simple distillation. |
| 6 | ½% PbCO$_3$ | 15 | 15 | 30 | 10 | 20 | 15 | 30 | 6 | 365 | Do. |
| 7 | ¼% PbCO$_3$ | 50 | 20 | 225 | 15 | 75 | 20 | 95 | 6 | 376.7 | positive naphthoquinone on forecut. partially purified by simple distillation. |
| 8 | ---do--- | 20 | 20 | 50 | 20 | 50 | 15 | 40 | 6 | 350 | positive naphthoquinone. |
| 9 | ---do--- | 15 | 15 | 40 | 10 | 20 | 15 | 50 | 9 | 318.5 | slightly positive naphthoquinone. |
| 10 | 0.1% PbCO$_3$ | 40 | 15 | 30 | 15 | 25 | 10 | 20 | 9 | 346.4 | positive naphthoquinone. |
| 11 | ---do--- | 55 | 15 | 40 | 20 | 35 | 15 | 45 | 12 | 333.1 | Do. |
| 12 | ---do--- | 20 | 15 | 40 | 15 | 40 | 10 | 25 | 18 | 338.8 | slightly positive naphthoquinone. |

We claim:

1. A process for the purification of crude phthalic anhydride containing color-forming impurities which comprises heating the crude phthalic anhydride in the molten state in the presence of a small quantity of lead carbonate and thereafter recovering the purified phthalic anhydride.

2. A process according to claim 1, wherein the lead carbonate is added in an amount of from about 0.1 to 1%, based on the weight of the phthalic anhydride.

3. A process according to claim 2, wherein the heating is continued for about 6 to 18 hours.

4. A process according to claim 3, wherein the heating is carried out at the reflux temperature of the crude phthalic anhydride.

5. A process according to claim 1 wherein the temperature of heating is from 127 to 285° C.

6. A process for the purification of crude phthalic anhydride containing color-forming impurities which comprises heating the crude phthalic anhydride in the molten state in the presence of 0.5 to 1% of lead carbonate 7. A process according to claim 6 wherein the heating is carried out at a temperature between 127 and 285° C.

8. A process according to claim 7 wherein the heating is carried out at reflux at a temperature of 285° C.

References Cited in the file of this patent

UNITED STATES PATENTS

| 1,817,304 | Foster | Aug. 4, 1931 |
| 2,529,448 | Conover | Nov. 7, 1950 |
| 2,547,505 | Steahly | Apr. 3, 1951 |

FOREIGN PATENTS

| 670,429 | Great Britain | Apr. 16, 1952 |

OTHER REFERENCES

I. G. Farben et al., "Mfg. of Phthalic Anhydride" (B. I. O. S. Final Report No. 935, item No. 30); May 10, 1955.